Oct. 26, 1926.
J. R. GAMMETER
1,604,273
METHOD FOR MAKING ENDLESS BANDS
Filed Sept. 8, 1922   2 Sheets-Sheet 1
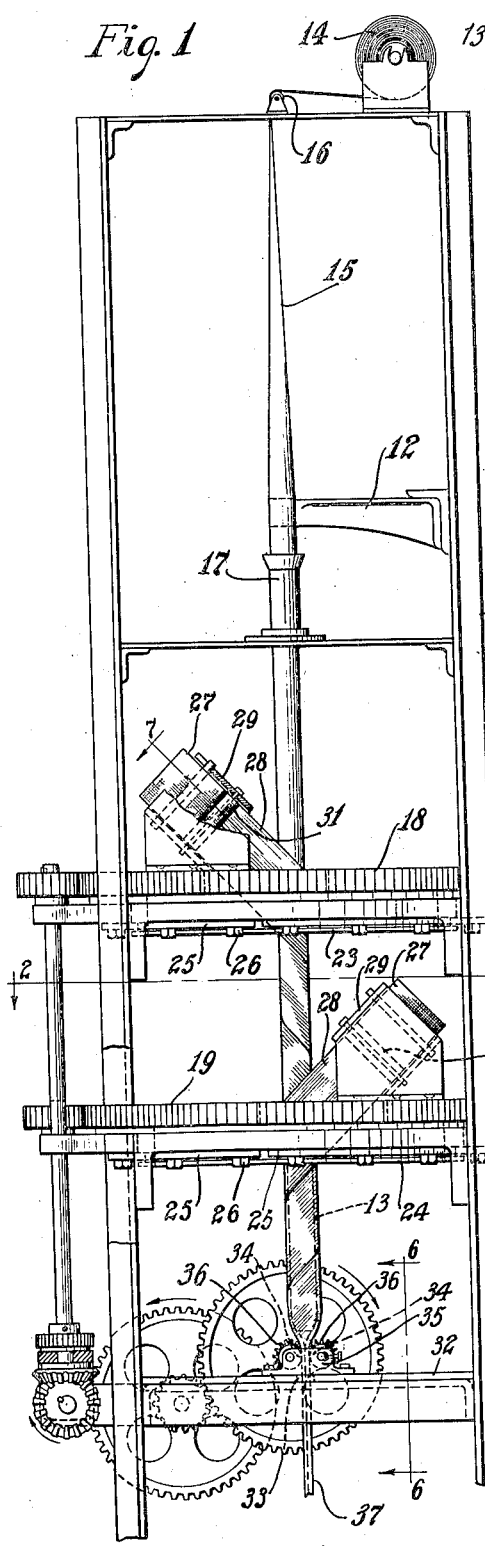
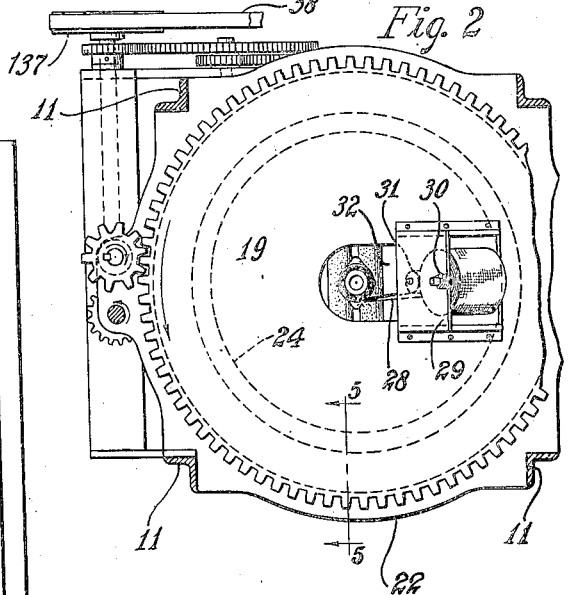
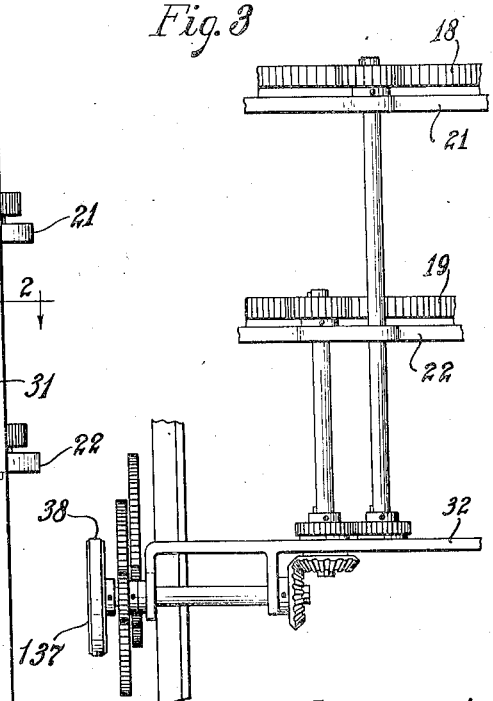
Inventor
John R. Gammeter.
By Robert M. Pierson
Atty.

Oct. 26, 1926.
1,604,273
J. R. GAMMETER
METHOD FOR MAKING ENDLESS BANDS
Filed Sept. 8, 1922        2 Sheets-Sheet 2
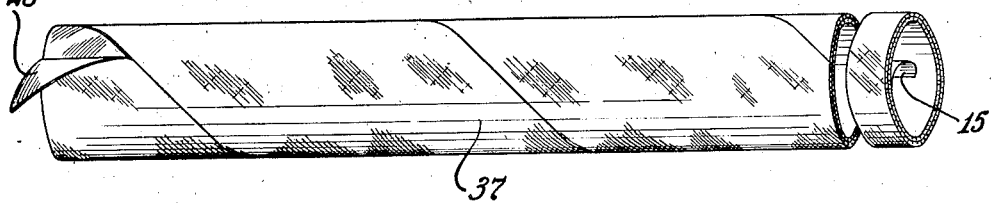
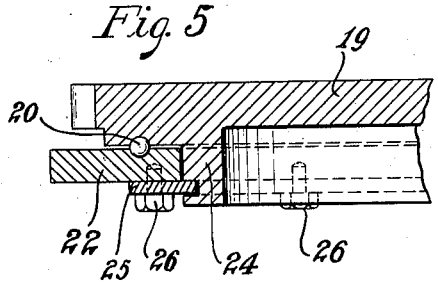
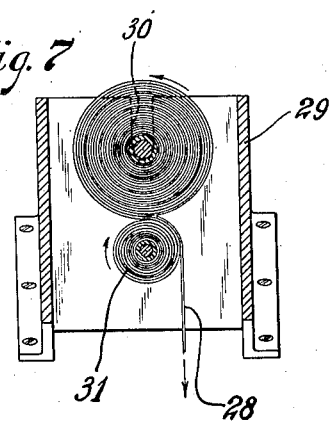
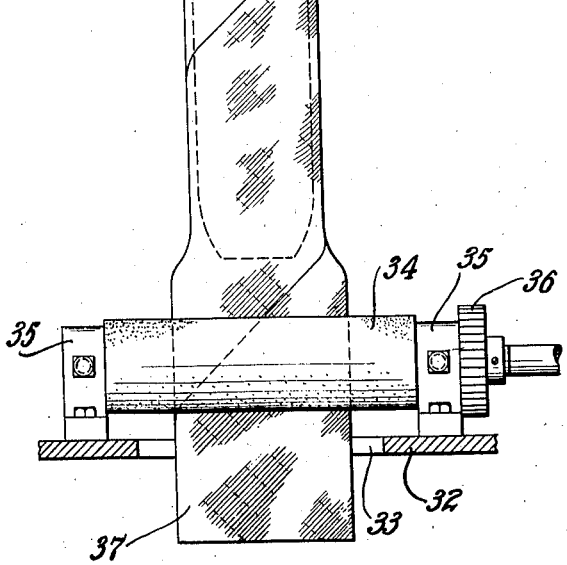
Inventor
John R. Gammeter.
By Robert M Pierson
Atty.

Patented Oct. 26, 1926.

1,604,273

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD FOR MAKING ENDLESS BANDS.

Application filed September 8, 1922. Serial No. 586,992.

This invention relates to methods for making endless bands, such, for example, as the bands of weak-wefted or weftless rubberized cord fabric used in the building of pneumatic tires. Such bands are commonly formed of straight, bias-cut pieces of the rubberized fabric, the ends being brought together and joined by hand.

My object is to provide an improved method for making endless bands whereby the bands may be made rapidly, economically and of accurate form and size.

Of the accompanying drawings, Fig. 1 is an elevation of a machine embodying and adapted to carry out a preferred form of my invention, with the work therein.

Fig. 2 is a horizontal section on line 2—2 of Fig. 1.

Fig. 3 is an elevation of part of the machine as viewed from the left of Fig. 1.

Fig. 4 is a perspective view of a length of the work as it comes from the machine, and a tire band cut therefrom.

Fig. 5 is an enlarged section on line 5—5 of Fig. 2.

Fig. 6 is an enlarged section on line 6—6 of Fig. 1.

Fig. 7 is an enlarged section on lines 7—7 of Fig. 1.

Referring to the drawings, 10 is an upright frame comprising four corner posts 11, 11, from one of which a bracket 12 projects to the center of the frame, where it supports a vertical, cylindrical mandrel 13 having approximately the same diameter as the inside diameter desired in the finished bands, said mandrel being supported only by the attachment of its upper end to the bracket 12, and preferably having its lower end tapered off as shown. The bracket 12 is preferably narrow, as viewed from above, adjacent the mandrel.

Mounted on the top of the frame 10, in suitable journal members, is a liner supply roll 14, from which a strip of liner 15 may be drawn over a guide roll 16 journaled at the center of the frame and adapted to direct the liner lengthwise onto the mandrel 13 to form the immediate support for band-forming stock wound thereon as hereinafter described.

Just below the bracket 12 is a liner-folding sleeve 17 surrounding the mandrel with sufficient tolerance to permit the liner to pass between it and the mandrel as it folds the liner about the latter, the liner being pulled from below as hereinafter described, and said folding sleeve being rigidly supported from the frame 10. The liner 15 preferably is of thin, bendable material such as paper or other material non-adhesive with uncured rubber, and may be glazed or anti-friction-treated to cause it to slip easily upon the mandrel.

In successive positions below the liner-folding sleeve 17 are winders 18, 19 concentrically surrounding the mandrel 13, formed with spur teeth on their outer peripheries, and rotatably supported by bearing balls, one of said balls being shown at 20, Fig. 5, said balls being mounted on an annular plate 21 or 22 secured between the corner posts 11. Each of the winders is formed with a downwardly extending annular flange, 23 or 24, rotatably fitting within the annular plate and grooved on its outer face to accommodate retaining plates 25, 25 secured to the under side of the annular plate by screw bolts 26, 26.

The winders 18, 19 are adapted to be driven in opposite directions, and upon each is journaled, upon an axis leaning toward the mandrel 13, preferably at an angle of about 45°, a fabric supply roll 27 adapted to give off a strip of fabric 28 to the mandrel as the winders are rotated about the latter, the fabric strips 28 preferably being of such width, with respect to the angle at which the supply-rolls lean toward the mandrel, that the successive helical turns of each fabric strip upon the mandrel abut each other at their edges, the resulting tubular structure of fabric and liner being pulled from below, by means hereinafter described, at such speed with relation to the speed and angle of the fabric-supply rolls as to cause the fabric strips to lie snugly throughout their widths as they pass onto the mandrel. The fabric rolls 27 are journaled in slots 30, 30 formed in the walls of housings or boxes 29, 29 secured upon the winders and are provided with liner-rewinding rolls 31, 31 also journaled in said boxes, each fabric roll being adapted to be held against its liner-rewinding roll by gravity and the pull of the off-running fabric. The liner-rewinding roll is thus adapted to be frictionally driven, by the fabric roll and the off-running fabric therefrom, to rewind the liner with which the fabric in the supply roll is interwound.

The liner-rewinding roll is also adapted to serve as a guide-roll for the fabric as the latter passes to the mandrel.

Secured between the corner posts 11 of the frame 10, just below the mandrel 13, is a horizontal plate 32 formed with a slot 33 under the mandrel, and a pair of work-driving rolls 34, 34 are journaled in brackets 35, 35 over said slot and provided with intermeshed driving gears, 36, 36, being thus adapted to embrace and drive the tubular structure 37, of wound fabric with the liner 15 therein, sliding it downward from the mandrel and so drawing the liner 15 onto the mandrel from above and through the folding sleeve 17. The work-driving rolls 34 and the winders 18, 19 are connected by a gear mechanism, clearly shown in Figs. 1, 2 and 3, said gear mechanism including a main-drive pulley 137 having a drive belt 38, and being adapted to drive the winders, in opposite directions, and the work-driving rolls 34 at a determinate relative speed such as to cause an accurate abutting of the edges of the fabric strips upon the mandrel with the particular width of fabric and corresponding angle of fabric roll used. It will be observed that, for proper laying of the fabric, there are four factors which must be accurately coordinated: the width of the fabric strip, the angle from which it approaches the mandrel, the speed of the winder, and the speed of the work-driving rollers. The first factor, however, the width of the fabric strip, may be increased, the other factors remaining the same, to give a lapped seam between successive turns of the fabric, if desired.

In the operation of the apparatus for producing tire bands of the usual cord construction, for example, the liner roll 14 and rolls 27 of cord fabric being mounted as shown, the forward end of the liner 15 is passed through the folding sleeve 17, about the mandrel 13, and started between the work driving rollers 34, by hand, the liner from the fabric rolls is started upon the liner-rewinding rolls 31, and the fabric strips 28 are started upon the liner 15 upon the mandrel adjacent each fabric roll. The machine preferably is then driven slowly while the wound tubular structure of fabric is slipped downward over the mandrel by hand, drawing with it the liner 15, which causes it to slip easily over the mandrel, and said tubular structure is started between the work-driving rolls 34. The machine is then run at full speed, delivering below a flattened, tubular, two-ply, fabric structure with the liner 15 therein, the liner preventing the sides of the flattened structure from sticking together, and also assisting to pull the work from the mandrel.

The warp cords of the respective fabric plies, and also the helical seams of the respective plies, lie at an angle to each other, giving strength to the fabric structure, the tacky plies of fabric sticking together so that the seam of each ply is bound together by the threads of the other ply crossing said seam. The product, preferably after passing from the mandrel, is cut cross-wise into tire bands, as shown in Fig. 4, being temporarily flattened in the cutting operation if desired, the liner 15 being preferably severed at the same time and subsequently removed from each band.

The accompanying drawings were made from a small sized apparatus, adapted to form bands of about three inches in diameter, wherefore the winders and other parts are shown as being quite large in proportion to the size of the mandrel. While the same proportions might be used for forming bands large enough for use in tires, it is not necessary, for the making of such larger bands, that the proportions here shown be maintained, since the fabric-supplying means may be positioned very close to the mandrel so long as the fabric strip is caused to approach the mandrel at the proper angle with relation to the width of the strip.

Modifications may be resorted to without departing from the scope of my invention, and I do not wholly limit my claims to the specific form of apparatus or the exact procedure here shown and described.

I claim:

1. The method of making endless bands of rubberized, fibrous material which comprises helically winding a strip of said material about a flexible liner to form a tubular structure of said material, flattening said structure with the liner therein, and cutting said structure, while so flattened, into endless bands.

2. The method of making endless bands which comprises applying a liner to a mandrel, helically winding a strip of band-forming material onto said mandrel and liner to form a tubular structure of said material, removing said structure and liner from said mandrel, and thereafter cutting said structure into endless bands.

3. The method of making endless tire-bands which comprises folding a liner about a mandrel, helically winding thereon a strip of tire-fabric to form a tubular structure of said fabric, and severing said structure into tire bands.

4. The method of making endless tire-bands which comprises helically winding a strip of tire fabric onto a liner to form a tubular structure of said fabric, cutting said tubular structure and liner, as a unit, into endless bands, and removing the severed pieces of liner from the severed, endless bands.

5. The method of making endless tire-bands which comprises folding a liner about a mandrel, helically winding thereon a strip of tire fabric to form a tubular structure of said fabric, removing said structure with the liner therein from the mandrel, severing said structure and the liner therein into short lengths, and removing the liner from said lengths.

6. The method of making bands of material including rubber which comprises applying a non-adhesive liner to a mandrel structure, applying a tubular layer of the said material to the said liner, severing the said tubular layer transversely into endless bands, and separating the endless bands from the liner.

7. The method of making endless bands which comprises applying a liner to a mandrel, helically winding two strips of band-forming material onto said mandrel and liner in non-parallel relation to form a laminated, tubular structure of said material, while sliding said structure and the liner lengthwise of the mandrel, and severing said structure into endless bands.

8. The method of making endless tire bands which comprises winding a strip of weak-wefted or weftless tire fabric helically about a liner to form a tubular structure of said fabric, helically winding another strip of such fabric thereon in a reverse direction, the strength-giving threads of the respective fabric strips being thus caused to lie at an angle to each other, flattening the resulting structure, and severing lengths therefrom.

9. The method of making endless tire bands which comprises folding a liner about a mandrel, helically winding thereon a strip of tire fabric, helically winding another strip of such fabric thereon in a reverse direction, thus producing a two-ply, tubular structure of fabric upon said liner and mandrel, removing said liner and said structure from the mandrel, and severing said structure into tire bands.

10. The method of making endless bands which comprises longitudinally feeding a continuous length of liner, progressively wrapping it laterally about a mandrel as it is so fed, the liner sliding on said mandrel, winding a continuous length of band-forming material helically onto said liner as the latter slides on said mandrel, to form a tubular structure of said band-forming material, and cutting successive lengths from said structure in the form of endless bands.

11. The method of making endless tire bands which comprises pulling a continuous length of liner longitudinally onto a mandrel, progressively wrapping it laterally about the mandrel as it is so pulled, the liner sliding upon the mandrel, winding continuous lengths of weak-wefted or weftless cord fabric in opposite directions helically onto said liner as the latter slides on said mandrel, to form a two-ply tubular structure of said fabric, and severing said tubular structure into endless bands.

12. The method of making endless tire bands which comprises pulling a continuous length of paper liner longitudinally onto a mandrel, progressively wrapping it laterally about the mandrel as it is so pulled, the liner sliding upon the mandrel, winding continuous lengths of weak-wefted or weftless cord fabric in opposite directions helically onto said liner as the latter slides on said mandrel, to form a two-ply tubular structure of said fabric, and severing said tubular structure into endless bands.

13. The method of making endless tire bands which comprises pulling a continuous length of an anti-friction-treated liner longitudinally onto a mandrel, progressively wrapping it laterally about the mandrel as it is so pulled, the liner sliding upon the mandrel, winding continuous lengths of weak-wefted or weftless cord fabric in opposite directions helically onto said liner as the latter slides on said mandrel, to form a two-ply tubular structure of said fabric, and severing said tubular structure into endless bands.

In witness whereof I have hereunto set my hand this 31st day of August, 1922.

JOHN R. GAMMETER.